(12) United States Patent
Depner et al.

(10) Patent No.: US 12,522,446 B2
(45) Date of Patent: Jan. 13, 2026

(54) CONTAINER SUPPLY DEVICE AND METHOD FOR OPERATING THE CONTAINER SUPPLY DEVICE

(71) Applicant: KRONES AG, Neutraubling (DE)

(72) Inventors: Christian Depner, Silberstedt (DE); Jens Luecke, Flensburg (DE); Niels Clausen, Steinbergkirche (DE)

(73) Assignee: KRONES AG, Neutraubling (DE)

( * ) Notice: Subject to any disclaimer, the term of this patent is extended or adjusted under 35 U.S.C. 154(b) by 149 days.

(21) Appl. No.: 18/250,506

(22) PCT Filed: Dec. 16, 2021

(86) PCT No.: PCT/EP2021/086219
§ 371 (c)(1),
(2) Date: Apr. 25, 2023

(87) PCT Pub. No.: WO2022/129342
PCT Pub. Date: Jun. 23, 2022

(65) Prior Publication Data
US 2023/0416014 A1 Dec. 28, 2023

(30) Foreign Application Priority Data
Dec. 18, 2020 (DE) .................... 10 2020 134 227.6

(51) Int. Cl.
*B65G 47/28* (2006.01)
(52) U.S. Cl.
CPC ...... *B65G 47/28* (2013.01); *B65G 2201/0235* (2013.01)
(58) Field of Classification Search
CPC .................................................. B65G 47/28
(Continued)

(56) References Cited

U.S. PATENT DOCUMENTS 4,889,225 A 12/1989 Van Uitert
6,959,802 B1 11/2005 Garvey
(Continued)

FOREIGN PATENT DOCUMENTS

DE 3715577 A1 * 11/1988 ............. B65G 47/68
DE 3129389 C2 2/1989
(Continued)

OTHER PUBLICATIONS

ISA European Patent Office, International Search Report Issued in Application No. PCT/EP2021/086219, Mar. 30, 2022, WIPO, 5 pages.

*Primary Examiner* — Gene O Crawford
*Assistant Examiner* — Lester Rushin, III
(74) *Attorney, Agent, or Firm* — McCoy Russell LLP

(57) ABSTRACT

The invention relates to a container supply device for supplying containers to a mass flow conveyor, comprising: —an at least single-track input conveyor, which can be driven in a first direction and is designed to convey containers in the first direction; adjoining the at least single-track input conveyor parallel to the at least single-track input conveyor, a first group of a plurality of parallel first conveyors, which can be driven in the first direction; adjoining the first group parallel to the first group, a second group of a plurality of parallel second conveyors, which can be driven in a second direction, which is opposite to the first direction. The containers can be transferred from the second group to a mass flow conveyor perpendicularly to the second direction. The invention also relates to a method for operating the container supply device.

17 Claims, 5 Drawing Sheets

(58) Field of Classification Search
USPC .............................. 198/434, 433, 432, 418
See application file for complete search history.

(56) References Cited

U.S. PATENT DOCUMENTS

| | | | |
|---|---|---|---|
| 8,079,458 B2 * | 12/2011 | Fleischmann | ........ B65G 47/715 |
| | | | 198/442 |
| 12,325,548 B2 * | 6/2025 | Saito | ..................... B65B 7/2807 |
| 2005/0178640 A1 | 8/2005 | Petrovic | |

FOREIGN PATENT DOCUMENTS

| | | | | |
|---|---|---|---|---|
| DE | 10255814 | A1 | 6/2004 | |
| DE | 60308498 | T2 | 6/2007 | |
| DE | 202014105593 | * | 2/2016 | |
| DE | 202014105593 | U1 | 2/2016 | |
| DE | 102016205304 | A1 | 10/2017 | |
| FR | 2531046 | A1 | 2/1984 | |
| KR | 101287160 | B1 * | 7/2013 | ............. B65G 47/52 |

\* cited by examiner

CONTAINER SUPPLY DEVICE AND METHOD FOR OPERATING THE CONTAINER SUPPLY DEVICE

CROSS REFERENCE TO RELATED APPLICATIONS

The present application is a U.S. National Phase of International Application No. PCT/EP2021/086219 entitled "CONTAINER SUPPLY DEVICE AND METHOD FOR OPERATING THE CONTAINER SUPPLY DEVICE," and filed on Dec. 16, 2021. International Application No. PCT/EP2021/086219 claims priority to German Patent Application No. 10 2020 134 227.6 filed on Dec. 18, 2020. The entire contents of each of the above-listed applications are hereby incorporated by reference for all purposes.

TECHNICAL FIELD

The invention relates to a container supply device according to claim 1 and a method for operating the container supply device according to claim 15.

BACKGROUND AND SUMMARY

DE 10 2016 205 304 A1 discloses a low-pressure storage device and/or distribution unit for containers, comprising a storage table with passage belts for conveying the containers through the storage table, and with storage belts extending on both sides along the passage belts and which can be driven more slowly than the passage belts. Furthermore, a feed belt for the containers is present in the input region. By the feed belt extending transversely, in particular at a right angle, with respect to the passage belts and the storage belts, by a transfer belt running in the opposite direction of the feed belt being in particular formed between the feed belt and the storage table, and by at least one deflection element for deflecting the containers from the feed belt onto the storage table being formed in the input region, a flow of fed containers can be selectively and reliably directed onto the passage belts, and simultaneously, an input region with a high input speed and compact dimensions can be provided.

DE 10 255 814 A1 discloses a device for guiding apart and partitioning container flows with at least one container input, at least two input belts and at least one guiding element disposed in the container flow, wherein the transport belts common in transport systems are guided within the process of guiding the container flow apart such that they guide apart and partition the container flow.

Such devices can require a lot of space in a system, and forces acting on the containers can be high.

Object

It is the object of the invention to provide a container supply device which can be operated in a space-saving manner and in which forces acting on the containers can be reduced.

Solution

This object is achieved by the container supply device according to claim 1 and the method for operating the container supply device according to claim 15. Further features of the invention are disclosed in the sub-claims.

The container supply device for supplying containers to a mass flow conveyor comprises an at least single-track input conveyor which is drivable in a first direction and is designed to convey containers in the first direction. The container supply device furthermore comprises, adjoining the at least single-track input conveyor parallel to the at least single-track input conveyor, a first group of a plurality of parallel first conveyors, which are drivable in the first direction and are designed to convey containers in the first direction, and adjoining the first group of a plurality of parallel first conveyors parallel to the first group, a second group of a plurality of parallel second conveyors, which are drivable in a second direction and are designed to convey containers in the second direction which is opposite to the first direction. The containers are transferrable from the second group of a plurality of parallel second conveyors in the direction of a mass flow conveyor transversely to the second direction.

The containers can comprise glass bottles, PET bottles and/or cans. The mass flow conveyor is generally not comprised in the container supply device, however, it is also possible that it is comprised in it.

The at least single-track input conveyor can be considered as an input to the first group. The first group can comprise a number of n>1 first conveyors, for example n=3. The first (n=1) one of the first conveyors can be disposed adjacent to the at least single-track input conveyor, the second (n=2) one of the first conveyors can be disposed adjacent to the first (n=1) one of the first conveyors, and the third (n=3) one of the first conveyors can be disposed adjacent to the second (n=2) one of the first conveyors.

The second group can comprise a number of m>1 second conveyors, for example m=3 (however, the number of conveyors in the first and the second group can also be different). The first (m=1) one of the second conveyors can be disposed adjacent to the third (n=3) one of the first conveyors, the second (m=2) one of the second conveyors can be disposed adjacent to the first (m=1) one of the second conveyors, and the third (m=3) one of the second conveyors can be disposed adjacent to the second (m=2) one of the second conveyors and the mass flow conveyor.

Adjoining parallel can mean that between the at least single-track input conveyor and/or the conveyors, and/or a conveyor and the mass flow conveyor, a distance can be provided that can be smaller than a diameter of a container, or a transfer plate having a width that can be smaller than a diameter of a container.

Summarizing, the first group can describe the plurality of first conveyors which are drivable in the first direction. In the process, the plurality of first conveyors can be designed to be individually driven. A control of drive speeds can be accomplished by means of a control device which can be comprised in the container supply device. The drive speeds can be the same or different for the plurality of first conveyors. The first conveyors can each comprise a transport surface, wherein the transport surfaces can be oriented in a coplanar manner. The same applies for the second group which can describe, as a summary, the plurality of second conveyors which can be driven in the second direction.

The designation "first" or "second" only serves to differentiate between the elements, but is otherwise not to be understood as a further restriction.

The at least single-track input conveyor can comprise a transport surface.

The container supply device can comprise a transfer region in which the containers of the second group of a plurality of parallel second conveyors are transferrable transversely to the second direction in the direction to a mass flow conveyor, the transfer region having a length which is at least twice as large as a conveying width of the container supply device.

The transfer region can be comprised in the second conveyor which is disposed adjacent to the mass flow conveyor. The transfer region can comprise at least a portion of the transport surface of this second conveyor, and from the transfer region, containers can be transferred by pushing containers transversely to the second direction in the direction to the mass flow conveyor.

The conveying width of the container supply device can here be composed of the sum of the conveying widths (a conveying width can be, for example, a width of the respective transport surface) of the at least single-track input conveyor, the first conveyor, and the second conveyor. One can also add to the conveying width of the container supply device, apart from this sum of the conveying widths, optional distances between the at least single-track input conveyor and the first group, and between the first group and the second group. Optional distances between the first conveyors and between the second conveyors can also be added to the conveying width of the container supply device. The width can be measured in a plane of the transport surfaces perpendicular to the first or second direction.

Since the length of the transfer region is at least twice as large as a conveying width of the container supply device, the containers can be transferred to the mass flow conveyor without a high pile-up pressure being formed between the containers. The length can be measured along the first or second direction.

The mass flow conveyor can comprise a conveyor belt or a plurality of conveyor belts disposed one next to the other which move in a third direction which extends perpendicularly to the first and the second direction. The mass flow conveyor is generally not comprised in the container supply device, however, it is also possible that it is comprised in the container supply device.

The transfer region can be disposed relative to the mass flow conveyor such that containers can be transferred from the transport surfaces of the second conveyors to a transport surface of the mass flow conveyor. The transfer region can be disposed opposite an inlet region of the mass flow conveyor.

Here, containers can be transferred from a second conveyor, which is disposed directly adjacent to the mass flow conveyor (possibly with a transfer plate/distance therebetween), directly (possibly directly via the transfer plate/the distance) to the mass flow conveyor (by the pressure of subsequent containers).

In another embodiment of the container supply device, adjoining the second group of a plurality of parallel second conveyors parallel to the second group, a further single-track (or a plurality of, for example, 2 or 3 further single-track) feed conveyor can be provided, wherein the further single-track feed conveyor or the plurality of further single-track feed conveyors are drivable in the first direction and be designed to convey containers in the first direction. A drive of the plurality of further single-track feed conveyors can be accomplished independently.

The further single-track feed conveyor or the plurality of further single-track feed conveyors can be disposed between the second group and the mass flow conveyor. It or they can be considered as an input to the mass flow conveyor.

Since the further single-track feed conveyor or the plurality of further single-track feed conveyors moves/move in the first direction, that means in the original input direction of the at least single-track input conveyor, a distribution and a transfer of the containers to the mass flow conveyor can be improved. Containers that are transferred from the further single-track feed conveyor or the plurality of further single-track feed conveyors to the mass flow conveyor can also well be transferred into a region of the mass flow conveyor which is opposite the end of the further single-track feed conveyor or the ends of the plurality of further single-track feed conveyors.

The further single-track feed conveyor or the plurality of further single-track feed conveyors can each comprise one transport surface.

The further single-track feed conveyor or the plurality of further single-track feed conveyors can comprise a supply length region along which containers can be supplied from the further single-track feed conveyor or the plurality of further single-track feed conveyors to the mass flow container, wherein the supply length region can have a length that is at least twice as large as one conveying width of the container supply device.

This conveying width of the container supply device can here be composed of the sum of the conveying widths (a conveying width can be, for example, a width of the respective transport surface) of the at least single-track input conveyor, the first conveyors, the second conveyors, and the further single-track feed conveyor or the plurality of further single-track feed conveyors. Apart from this sum of the conveying widths, optional distances between the at least single-track input conveyor and the first group, between the first group and the second group, and between the second group and the further single-track feed conveyor/conveyors can be added to the conveying width of the container supply device. Optional distances between the first conveyors, between the second conveyors and, if present, between the plurality of further single-track feed conveyors can also be added to the conveying width of the container supply device. The width can be measured in a plane of the transport surfaces perpendicular to the first or second direction.

The length of the supply length region can be measured along the first or second direction. The supply length region can extend along a portion of the transport surface of the further single-track feed conveyor. Since the length of the supply length region is at least twice as large as a conveying width of the container supply device, the containers can be transferred to the mass flow conveyor without a high pile-up pressure being formed between the containers.

Above a transport surface of the at least single-track input conveyor and above at least some transport surfaces of the plurality of parallel first conveyors, a rail with deflectors can be provided.

The term "above" can here and below moreover include that the rail might not only be provided in a region where a physical contacting with the containers, for example in a region of action on the containers, can occur, but also in a region where no physical contacting with the containers can occur (the rail can then be present outside a region of action on the containers). A physical contacting can be effected when the container at least partially contacts the rail at least partially.

The rail can comprise a plurality of layers which can be disposed at least partially in an overlapping manner like fish scales. By the at least partial overlap, one deflector or a plurality of deflectors can be embodied.

The deflectors of this rail can have the same or different cross-sectional shapes, for example depending on the position of the rail where they are provided, for example, the deflectors can have smaller dimensions closer to the at least single-track input conveyor than the deflectors that are provided further away from the at least single-track input conveyor. A cross-section of a deflector, and thus its cross-sectional shape, can be determined in a plane parallel to the conveyor surface of the at least single-track input conveyor.

The deflectors can be provided along the rail, for example in a longitudinal direction of the rail, at equal or different distances. By means of the deflectors in the rail, the containers can be distributed from the single-track input to the plurality of parallel first conveyors without any pressure or only little pressure from the subsequent containers.

A deflector can be designed such that it branches off from the rail at a flat angle, the rail having, for example, a straight or a bent extension, and leads back at a steep angle. The flat angle can prevent containers coming into contact with a deflector from tipping over and/or prevent a pressure (pile-up pressure and/or delivery pressure) acting on the containers from becoming too high. One can achieve, for example, that a force of 50 N to 80 N is not exceeded. By the steep angle, sufficient space can be given to the containers having passed the deflector to possibly move into a region behind the deflector.

If, for example, five first conveyors are provided, the rail with the deflectors can extend, with a view into the first direction, initially straightly along a first side (e. g. the right side) of the at least single-track input conveyor, then obliquely, by means of three deflectors, over the at least single-track input conveyor, subsequently straightly along a first side (e. g. the right side) of the first one of the first conveyors, by means of a deflector then partially obliquely over the first one of the first conveyors, then straightly along the middle of the first one of the first conveyors, subsequently, by means of one deflector, partially obliquely over the second one of the first conveyors. The rail with the deflectors is, for example, not provided above a transport surface of the third to fifth ones of the first conveyors. There, another rail or the like, or a deflection device of a different type can be provided.

At the end of at least some of the plurality of parallel first conveyors and at the beginning of at least some of the plurality of parallel second conveyors, above the transport surfaces, a concavely designed rail can be provided, wherein the concavely designed rail comprises, for example, a curve which describes an angle that can be within a range of angles of 165° to 195°.

For example, a 180° curve can be provided.

By the curve, the transfer of the containers from the second group or from the further single-track feed conveyor to the mass flow conveyor, that means, for example, the filling of the mass flow conveyor, can be decoupled from the container flow running in through the at least single-track input conveyor. Relatively high pressure loads on containers by a backup into the at least single-track input conveyor can be avoided.

If five first and five second conveyors are provided, the concavely designed rail can be provided above the transport surfaces of the second to fifth first conveyors and the first to fifth second conveyors.

The rail with the deflectors can pass over into the concavely designed rail. Thus, a trouble-free transport of containers can be ensured which pass from a region of the rail with the deflectors to a region of the concavely designed rail.

Above the transport surface at the end of the further single-track feed conveyor or above the conveying surfaces at the ends of the plurality of further single-track feed conveyors (if this/these is/are provided in the container supply device), a further concave rail can be provided, wherein the further concavely designed rail passes over, for example, into the concavely designed rail wherein the further concave rail comprises, for example, a curve which describes an angle that can be within a range of angles of 75° to 105°.

For example, a 90° curve can be provided.

By the further concave rail, containers that are transferred from the further single-track feed conveyor or the plurality of further single-track feed conveyors to the mass flow conveyor can also well be transferred into a region of the mass flow conveyor which is opposite the end of the further single-track input conveyor or the ends of the plurality of further single-track input conveyors.

Above the transfer surfaces of the first and second groups, between the first group and the second group, a straight rail can be provided which is designed such that a transfer region for containers can be provided between the first group and the second group.

The straight rail can prevent containers from unintentionally passing from the first group to the second group.

The transfer region is provided for an intended transfer of containers between the first group and the second group; the straight rail is not provided in the transfer region. The transfer region for containers between the first group and the second group can comprise a distance, which can be smaller than a diameter of a container, between the first and second groups, or a transfer plate with a width which can be smaller than a diameter of a container.

Above the transport surfaces of the plurality of parallel second conveyors, a rail with steps can be provided, wherein, for example, the rail with the steps keeps the transfer region free for containers. By the steps, the containers can be directed from the plurality of parallel second conveyors towards the mass flow conveyor without or only with little pressure.

A step can be designed such that it branches off from the rail at a flat angle, the rail having a straight or a bent extension, for example, and where the rail continues at its end of the step. The flat angle can avoid containers coming into contact with the deflector from tipping over, and/or a pressure (pile-up pressure and/or delivery pressure) acting on the containers from becoming too high.

By the rail with the steps, containers can be moved along, obliquely along, and/or transversely to the second conveyors. The containers can thus be brought to the last one of the second conveyors and from there, for example, transferred to the mass flow conveyor or to the further single-track feed conveyor or the plurality of further single-track feed conveyors.

If five second conveyors are provided, the rail with the steps can extend from the first to the fifth second conveyor. Here, the rail can extend obliquely over the first one of the second conveyors, in the transition from the first one to the second one of the second conveyors, a step can be provided, subsequently, the rail can extend from the middle of the second one of the second conveyors to the middle of the third one of the second conveyors, then, a step can be provided in the transition from the third to the fourth one of the second conveyors, and subsequently, the rail can extend to the middle of the fifth one of the second conveyors.

The straight rail can pass over into the rail with the steps. Thus, a trouble-free transport of containers which pass from a region of the straight rail into a region of the rail with the steps can be ensured.

The transition region can, seen along the first or the second direction, have a length whose value is greater by a factor of 1.8 to 3 or by a factor of 1.5 to 4 (the boundaries of the range are included) than a value of a conveying width of the first group or the second group. By this length of the transition region, a loose transport of the containers can take place.

The at least single-track input conveyor, and/or the plurality of parallel first conveyors, and/or the plurality of parallel second conveyors, and/or the further single-track feed conveyor, or the plurality of further single-track feed conveyors (if provided in the container supply device) can each comprise transport surfaces that are disposed in a coplanar manner in a plane, wherein the plane can include, with a plane perpendicular to the direction of action of the force of gravity, an angle of 0.5° to 14° (the boundaries of the range are included), or, for example, an angle of 0.5° to 11°, or, for example, an angle of 0.5° to 8°.

By the coplanar arrangement of the respective transport surfaces in a plane, the transition of containers between the different conveyors is possible.

The coplanar arrangement can also be provided without the plane including an angle of 0.5° to 14° with a plane perpendicular to the direction of action of the force of gravity, for example, if the angle is 0°.

By the plane possibly including an angle of 0.5° to 14° with the plane perpendicular to the direction of action of the force of gravity, or, for example an angle of 0.5° to 11°, or, for example, an angle of 0.5° to 8°, the parallel component of the force of gravity can additionally act on the containers.

The value ranges mentioned here and further below for an angle that the plane in which the respective transport surfaces are located can include with a plane perpendicular to the direction of action of the force of gravity can be selected or determined taking into consideration a type of container to be transported. Containers to be transported can be transported in a stable manner despite the included angle. Despite the included angle, a tipping over of the containers or a non-stable transport should be avoided. In one type of container, a height of the center of gravity of the container above the transport surface, and/or a support surface of the container on the transport surface, and/or a stiffness of the container, and/or a weight of the container can be taken into consideration for a selection or determination of the angle. For PET bottles, for example 1.5 L PET bottles, the plane of the transport surfaces can include an angle of 0.5° to 2° with the plane perpendicular to the direction of action of the force of gravity. For cans, for example metal or composite cans, the plane of the transport surfaces can include an angle of 1° to 5° with the plane perpendicular to the direction of action of the force of gravity. For glass bottles, for example 0.5 L beer bottles or 1 L soft drink bottles, the plane of the transport surfaces can include an angle of 3° to 8° with the plane perpendicular to the direction of action of the force of gravity.

The angle that the plane of the transport surfaces includes with the plane perpendicular to the direction of action of the force of gravity can be selected or determined to be as large as possible and as small as necessary.

The rail with the deflectors, the concavely designed rail, the straight rail, the rail with the steps, and/or the further concavely designed rail (if it is provided in the container supply device) can also be arranged in an inclined manner and include an angle with a plane perpendicular to the direction of action of the force of gravity that can be within a range of 0.5° to 14° (boundaries of the range included), or, for example, within a range of 0.5° to 11°, or, for example, a range of 0.5° to 8°.

The container supply can be arranged on a supporting structure or a plurality of supporting structures or the like and comprise, for example, a tilting mechanism or a plurality of tilting mechanisms. The supporting structure or the supporting structures can be connected with the tilting mechanism or the tilting mechanisms, so that by means of the tilting mechanism or the tilting mechanisms, the angle is variable and/or adjustable. The tilting mechanism or the tilting mechanisms can be controlled with one or a plurality of control devices. The one or the plurality of control devices of the tilting mechanism or tilting mechanisms can also be provided for controlling drive speeds of the conveyors, or the one or the plurality of control devices of the tilting mechanism or tilting mechanisms can be provided independent of a control device for controlling drive speeds of the conveyors.

The container supply device can furthermore comprise a control device for controlling drive speeds of the conveyors, wherein, for example, a controller can be provided wherein the mathematical amount of drive speeds in the first direction each decreases, starting from the at least single-track input conveyor to the plurality of parallel first conveyors, wherein the mathematical amount of drive speeds of the plurality of parallel second conveyors in the second direction initially increases and then decreases again, and/or wherein the mathematical amount of a drive speed of the further single-track feed conveyor (if provided in the container supply device) in the first direction is the smallest one of the mathematical amounts, or wherein the mathematical amounts of drive speeds of the plurality of further single-track feed conveyors in the first direction are each smaller than an amount of the drive speed of the slowest one of the plurality of parallel second conveyors.

For example, a grading of the different drive speeds with respect to each other can be non-linear. The gradings can each be percental with respect to each other or each have a factor.

The drive speed of the at least single-track input conveyor can serve as a boundary condition for the drive speeds of the other conveyors (first conveyor, second conveyor, further single-track feed conveyor/conveyors). Possibly, the conveyor arranged upstream of the mass flow conveyor can be operated at most with a maximum drive speed. This maximum drive speed can possibly not be exceeded to permit a transfer of the containers from the conveyor arranged upstream of the mass flow conveyor to the mass flow conveyor.

If the drive speed of the at least single-track input conveyor is increased/reduced, the drive speeds of the subsequent conveyors (first conveyors, second conveyors, further single-track feed conveyor/conveyors) can each be increased/reduced. The respective increases/reductions can be accomplished in a non-linear manner. For example, the drive speeds can be increased/reduced by percentage, or the drive speeds can each be doubled/reduced by half.

The drive speeds of the at least single-track input conveyor can be between 0.05 m/s (for example, with a performance of 4,500 containers per hour and a container diameter of 35 to 40 mm) and 5 m/s (for example, with a performance of 225,000 containers per hour and a container diameter of 75 to 80 mm). As an alternative or in addition, the drive speeds of the at least single-track input conveyor can be between 0.15 m/s (for example, with a performance of 10,000 containers per hour and a container diameter of 5° to 53 mm) and 3.5 m/s (for example, with a performance of 180,000 containers per hour and a container diameter of 64 to 66 mm).

As an example of the different drive speeds, the following example is mentioned: For the at least single-track input conveyor, 1.7 m/s can be provided. For example, for five first conveyors of a first group, 0.85 m/s, 0.6 m/s, 0.55 m/s and 0.25 m/s can be provided. For example, for five second conveyors of a second group, 0.15 m/s, 0.35 m/s, 0.4 m/s, 0.35 m/s and 0.15 m/s can be provided. If the further single-track feed conveyor is present, 0.08 m/s can be provided for it. For example, the mathematical amount of a drive speed of the mass flow conveyor can be 0.0156 m/s.

The control device can moreover or only be designed to control an amount of the drive speed of the at least single-track input conveyor such that the at least single-track input conveyor transports containers in a number per unit of time into the first direction corresponding to the number per unit of time of a device arranged upstream of the container supply device. The device can be disposed directly upstream of the container supply device, wherein, for example, only one or a plurality of conveyors can be arranged between the upstream device and the container supply device. For example, the control device can be designed such that it obtains information and/or data of the upstream device comprising the number per unit of time.

The container supply device can be designed such that exactly one single-track input conveyor can be provided.

As an alternative, the container supply device can be designed such that two or more single-track input conveyors can be provided.

The at least single-track input conveyor, the first conveyors of the first group, the second conveyors of the second group, and the one or the plurality of single-track feed conveyors can each extend in parallel or essentially in parallel with respect to each other. The above mentioned conveyors can be designed such that both an amount of the drive speed and the direction of the drive speed are variable. These conveyors can be designed to be drivable in the first and the second directions.

For example, it is not provided for a conveyor that can be comprised in the container supply device described above or below and that can transport containers in a n. direction to be able to describe one or several curves and to subsequently transport the containers in a m. direction, wherein the n. and the m. direction are opposed to each other. This also applies for a plurality of conveyors that can be comprised in the container supply device described above or below. The one or the plurality of conveyors can comprise or be: the at least single-track input conveyor, one or a plurality of the first conveyors of the first group, one or a plurality of the second conveyors of the second group, the further one or one of the plurality of or a plurality of the plurality of further single-track feed conveyors.

The invention furthermore relates to the method for operating the container supply device as described above or below.

In the method, a control of the container supply device can be accomplished by means of the control device.

If a control of the container supply device is accomplished by means of the control device, in a control, the mathematical amount of the drive speed of the at least single-track input conveyor in the first direction can be within a range of 0.05 m/s to 3.5 m/s. Here, it can furthermore be provided that the mathematical amount of drive speeds in the first direction each decreases, starting from the at least single-track input conveyor to the plurality of parallel first conveyors, wherein the mathematical amount of drive speeds of the plurality of parallel second conveyors in the second direction initially increases and then decreases again, and/or wherein the mathematical amount of a drive speed of the further single-track feed conveyor (if provided in the container supply device) in the first direction is the smallest one of the mathematical amounts, or wherein the mathematical amounts of drive speeds of the plurality of further single-track feed conveyors in the first direction are each smaller than an amount of the drive speed of the slowest one of the plurality of parallel second conveyors.

For example, in a control, the mathematical amount of the drive speed of the at least single-track input conveyor in the first direction can be within a range of 1.5 m/s to 1.9 m/s, wherein the mathematical amount of the drive speeds of the plurality of parallel first conveyors in the first direction can decrease from 0.65 m/s to 1.05 m/s to 0.05 m/s to 0.45 m/s, wherein the mathematical amount of the drive speeds of the plurality of parallel second conveyors in the second direction can first increase from 0.01 m/s to 0.35 m/s to 0.2 m/s to 0.6 m/s, and then decrease again from 0.15 m/s to 0.55 m/s to 0.01 m/s to 0.35 m/s, and/or wherein the mathematical amount of a drive speed of the further single-track feed conveyor (if provided in the container supply device) in the first direction is the smallest one of the mathematical amounts with 0.06 m/s to 0.1 m/s. The stated boundaries of the ranges are each included.

The values of the mathematical amounts as stated further above can here also be provided for the control.

For the drive speeds, the statements already given above can apply.

BRIEF DESCRIPTION OF THE FIGURES

The enclosed figures serve for a better understanding and for illustrating aspects of the invention. In the drawings.

DESCRIPTION OF FIGURES

Figure 1:
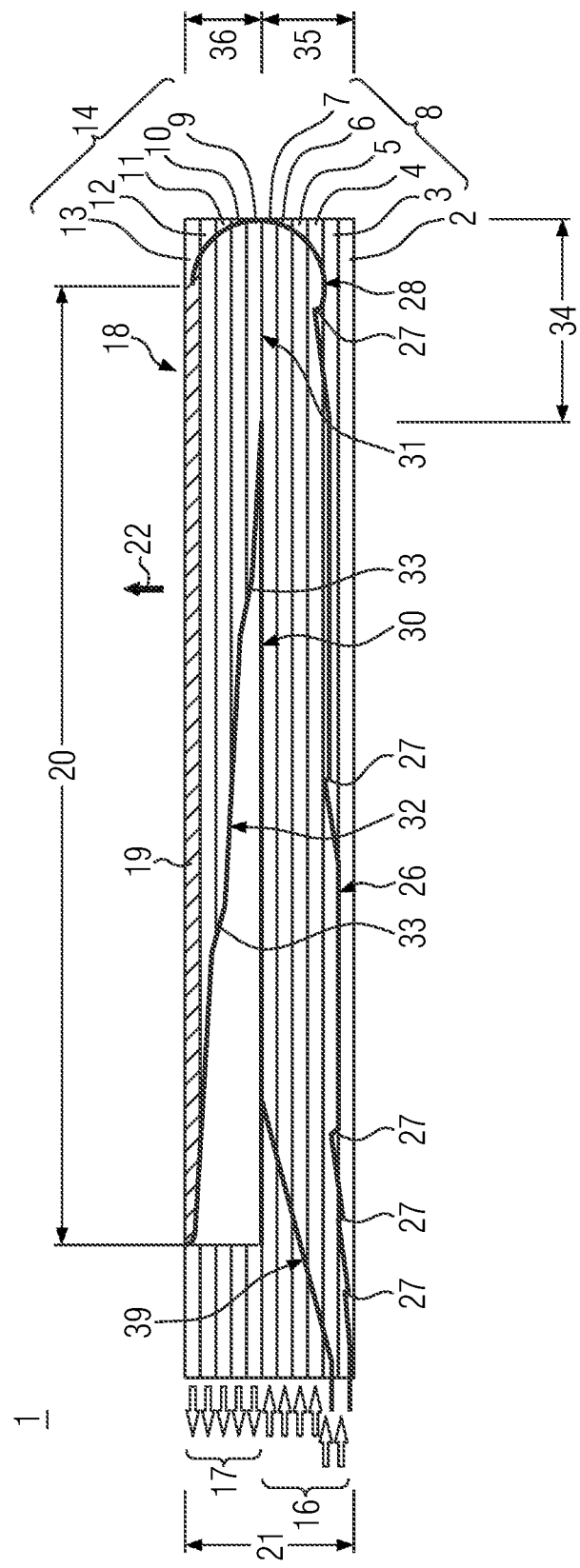
FIG. 1 shows a plan view onto a schematic view of a first embodiment of a container supply device.

FIG. 1 shows a plan view onto a schematic view of a first embodiment of a container supply device 1 for supplying containers to a mass flow conveyor 18. The mass flow conveyor 18 is generally not comprised in the container supply device 1, however, it is also that it is comprised in it.

The container supply device 1 comprises an at least single-track input conveyor 2 (here presented with a single track and therefore referred to as single-track input conveyor below) which is drivable in a first direction 16 and can convey containers transported, for example, on its transport surface into the first direction.

Adjoining the single-track input conveyor 2 parallel to the single-track input conveyor, a first group 8 of a plurality of parallel first conveyors 3, 4, 5, 6, 7, which is drivable in the first direction 16 each, is provided. On the respective transport surfaces of the first conveyors 3 to 7, containers can be conveyed in the first direction 16.

Adjoining the first group 8 parallel to the first group, a second group 14 of a plurality of parallel second conveyors 9, 10, 11, 12, 13, which are drivable in a second direction 17 each, is provided. On the respective transport surfaces of the second conveyors 9 to 13, containers can be conveyed in the second direction 17. The first and second directions 16, 17 are opposed with respect to each other.

Above one transport surface of the single-track input conveyor 2 and the transport surfaces of the first and second ones of the first conveyors 3, 4, a rail 26 with five deflectors 27 is arranged. This rail 26 passes over into a concavely designed rail 28 above the transport surface of the end of the second one of the first conveyors 4, the rail being provided at the end of the second, third, fourth and fifth ones of the first conveyors 4 to 7, and at the beginning of the first to fifth ones of the second conveyors 9 to 13 above the transport surfaces. Here, the concavely designed rail 28 comprises a curve that describes an angle of 180°.

Above the transport surfaces of the first and the second group 8, 14, between the first group 8 and the second group 14, a straight rail 30 is provided which is designed such that a transition region 31 for containers is present between the first group 8 and the second group 14. Above the transport surfaces of the first and the second group 8, 14, between the first group 8 and the second group 14, can here mean above between the transport surfaces of the last one of the first conveyors 7 and the first one of the second conveyors 9.

The transition region 31, seen along the first or the second direction 16, 17, has a length 34 whose value is greater by a factor of 1.8 to 3 than a value of a conveying width 35, 36 of the first or second group 8, 14.

Above the transport surfaces of the plurality of parallel second conveyors 9 to 13, a rail 32 with two steps 33 is provided which leaves the transition region 31 free for the containers. The straight rail 30 passes over into the rail 32 with the two steps 33.

Above the transport surfaces of the plurality of parallel first conveyors 3 to 7, a further straight rail 39 is arranged which extends from the single-track input conveyor 2 to the straight rail 32.

The containers can be transferred from the second group 14 of a plurality of parallel second conveyors 9 to 13 transversely to the second direction 17 in the direction 22 to the mass flow conveyor 18. For example, the containers of the fifth one of the second conveyors 13 can be transferred transversely to the second direction 17 in the direction 22 to the mass flow conveyor 18.

A transfer region 19 (indicated by the hatching), in which the containers can be transferred from the fifth one of the second conveyors 13 transversely to the second direction 17 in the direction 22 to the mass flow conveyor, has a length 20 that is at least twice as large as a conveying width 21 of the container supply device 1. The conveying width 21 here is composed of the sum of the conveying widths 35, 36 of the single-track input conveyor 2, the first conveyors 3 to 7, and the second conveyors 9 to 13.

The drive speeds of the single-track input conveyor 2, the first conveyors 3 to 7, and the second conveyors 9 to 13 can be individually controlled by means of a (non-depicted) control device. Here, the mathematical amount of drive speeds can each decrease, starting from the single-track input conveyor 2 to the plurality of parallel first conveyors 3 to 7, the mathematical amount of drive speeds of the plurality of parallel second conveyors 9 to 13 can initially increase and then decrease again.

A mathematical amount of a drive speed of the mass flow conveyor 18 in the direction 22 can be the smallest one.

Figure 2:
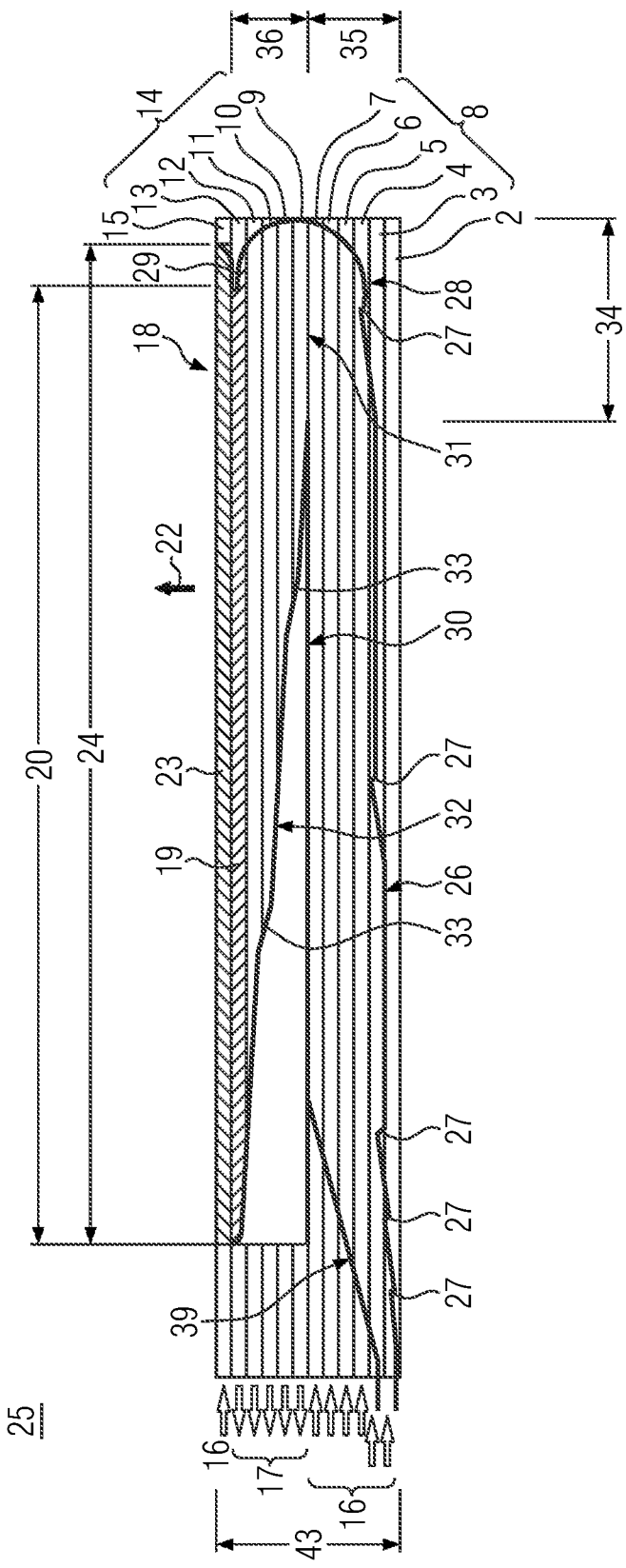
FIG. 2 shows a plan view onto a schematic view of a second embodiment of a container supply device.

FIG. 2 shows a plan view onto a schematic view of a second embodiment of a container supply device 25. In FIG. 2, elements of the first embodiment of FIG. 1 that also appear in the second embodiment are designated with the same reference numerals. The description with respect to the first embodiment also applies for these elements in the second embodiment; only the transition to the mass flow conveyor 18 from the container supply device 25 is different from that of the container supply device 1.

In the second embodiment of the container supply device 25, adjoining the second group 14 of a plurality of parallel second conveyors 9 to 13 parallel to said second group, a further single-track feed conveyor 15 is provided. A plurality of further feed conveyors each with a single track can also be provided one next to the other and adjoin the second group. The further single-track feed conveyor 15 can be driven in the first direction 16 and is designed to convey containers in the first direction 16, for example on a transport surface. Containers of the further single-track feed conveyor 15 can be transferred to the mass flow conveyor 18 transversely to the first direction 17 in the direction 22. The same applies for the case where a plurality of further single-track feed conveyors is provided.

The further single-track feed conveyor 15 comprises a supply length region 23 (indicated by the section lines) along which the containers can be supplied from the further single-track feed conveyor 15 to the mass flow conveyor 18. The supply length region 23 has a length 24 which is at least twice as large as a conveying width 43 of the container supply device 25. The same applies for the case where a plurality of further single-track feed conveyors is provided.

This conveying width 43 is here composed of the sum of the conveying widths of the single-track input conveyor 2, the first conveyors 3 to 7, the second conveyors 9 to 13, and the further single-track feed conveyor 15 or the plurality of further single-track feed conveyors. The conveying widths can be measured perpendicularly to the first or second direction.

The length 24 of the supply length region 23 can be measured along the first or second direction 16, 17. The supply length region 23 extends along a portion of the transport surface of the further single-track feed conveyor 15. Since the length 24 of the supply length region 23 is at least twice as large as the conveying width 43 of the container supply device 25, the containers can be transferred to the mass flow conveyor 18 without a high pile-up pressure being formed between the containers.

Above the transport surface at the end of the further single-track feed conveyor 15, a further concave rail 29 is provided which comprises a 90° curve. The further concavely designed rail 29 passes over into the concavely designed rail 28.

By the further concave rail 29, containers that are transferred from the further single-track feed conveyor 15 to the mass flow conveyor 18 can also well be transferred into a region of the mass flow conveyor 18 which is opposite to the end of the further single-track feed conveyor 15 (in the representation, the right corner region of the mass flow conveyor 18).

Figure 3:
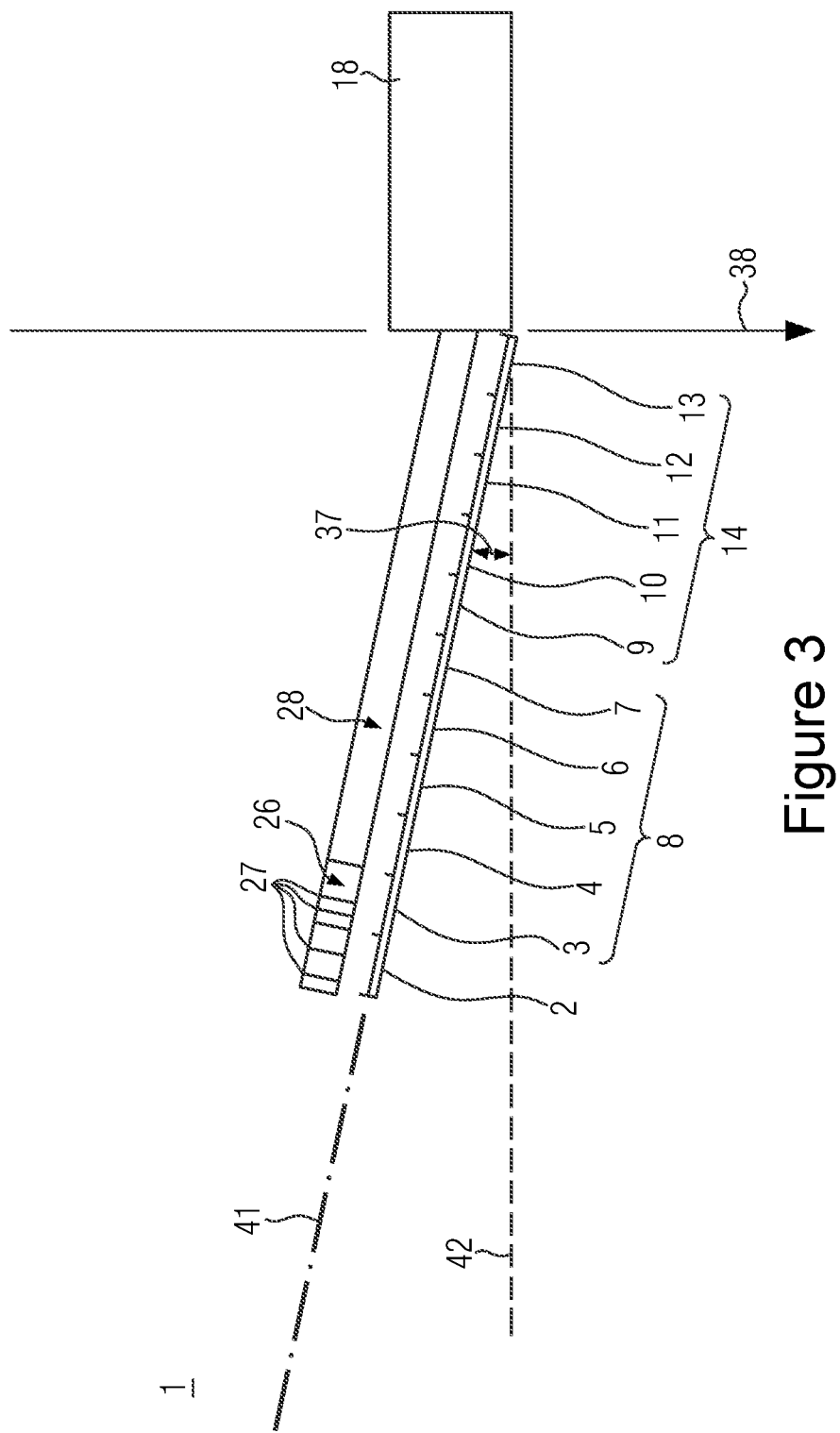
FIG. 3 shows a side view of FIG. 1 with a view into the second direction, wherein the transport surfaces are arranged in an inclined manner.

FIG. 3 shows a side view of FIG. 1 with a view into the second direction 17, wherein the transport surfaces of the single-track input conveyor 2, the first conveyors 3 to 7, and the second conveyors 9 to 13 are arranged in an inclined manner. The transport surfaces are arranged in a coplanar manner in a plane 41. The plane 41 includes an angle 37 with a plane 42 perpendicular to the direction of action 38 of the force of gravity, wherein the angle can be within a range of 0.5° to 14° (boundaries of the range included), or, for example, an angle of 0.5° to 11°, or, for example, an angle of 0.5° to 8°.

The rail 26 with the deflectors 27, the concavely designed rail 28, the straight rail 30, the rail 32 with the steps 33, and the further straight rail 39 are also arranged in an inclined manner and include an angle with a plane 42 perpendicular to the direction of action 38 of the force of gravity that can be within a range of 0.5° to 14° (boundaries of the range included), or, for example, an angle of 0.5° to 11°, or, for example, an angle of 0.5° to 8°.

Figure 4:
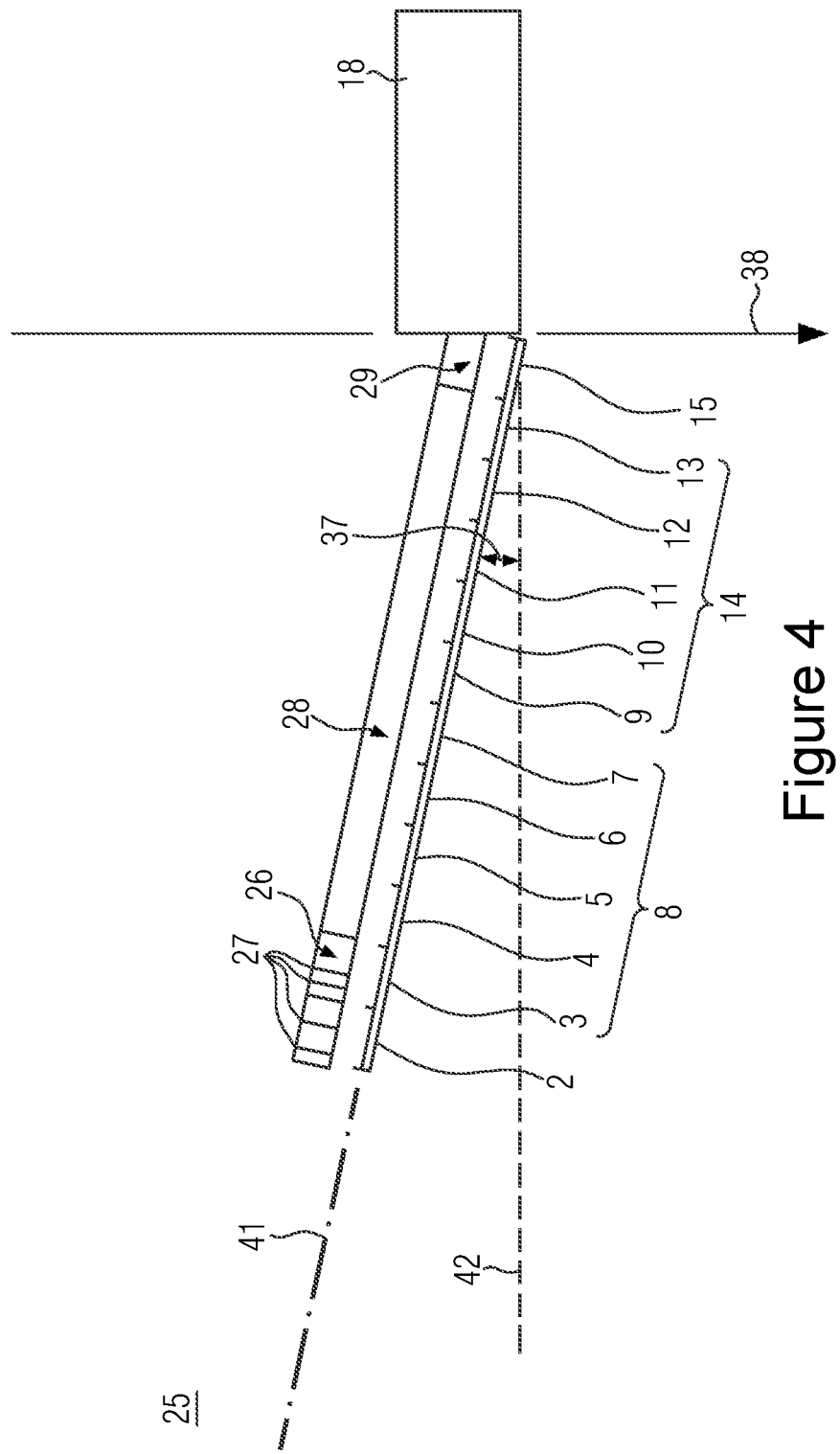
FIG. 4 shows a side view of FIG. 2 with a view into the second direction, wherein the transport surfaces are arranged in an inclined manner.

FIG. 4 shows a side view of FIG. 2 with a view into the second direction 17, wherein the transport surfaces of the single-track input conveyor 2, the first conveyors 3 to 7, the second conveyors 9 to 13, and the further single-track feed conveyor 15 are arranged in an inclined manner. For the case where a plurality of further single-track feed conveyors are provided, these can also be inclined.

The transport surfaces are arranged in a coplanar manner in a plane 41. The plane 41 includes an angle 37 with a plane 42 perpendicular to the direction of action 38 of the force of gravity, wherein the angle can be within a range of 0.5° to 14° (boundaries of the range included), or, for example, an angle of 0.5° to 11°, or, for example, an angle of 0.5° to 8°.

The rail 26 with the deflectors 27, the concavely designed rail 28, the straight rail 30, the rail 32 with the steps 33, the further straight rail 39, and the further concavely designed rail 29 are also arranged in an inclined manner and include an angle with a plane 42 perpendicular to the direction of action 38 of the force of gravity that can be within a range of 0.5° to 14° (boundaries of the range included), or, for example, an angle of 0.5° to 11°, or, for example, an angle of 0.5° to 8°.

Figure 5:
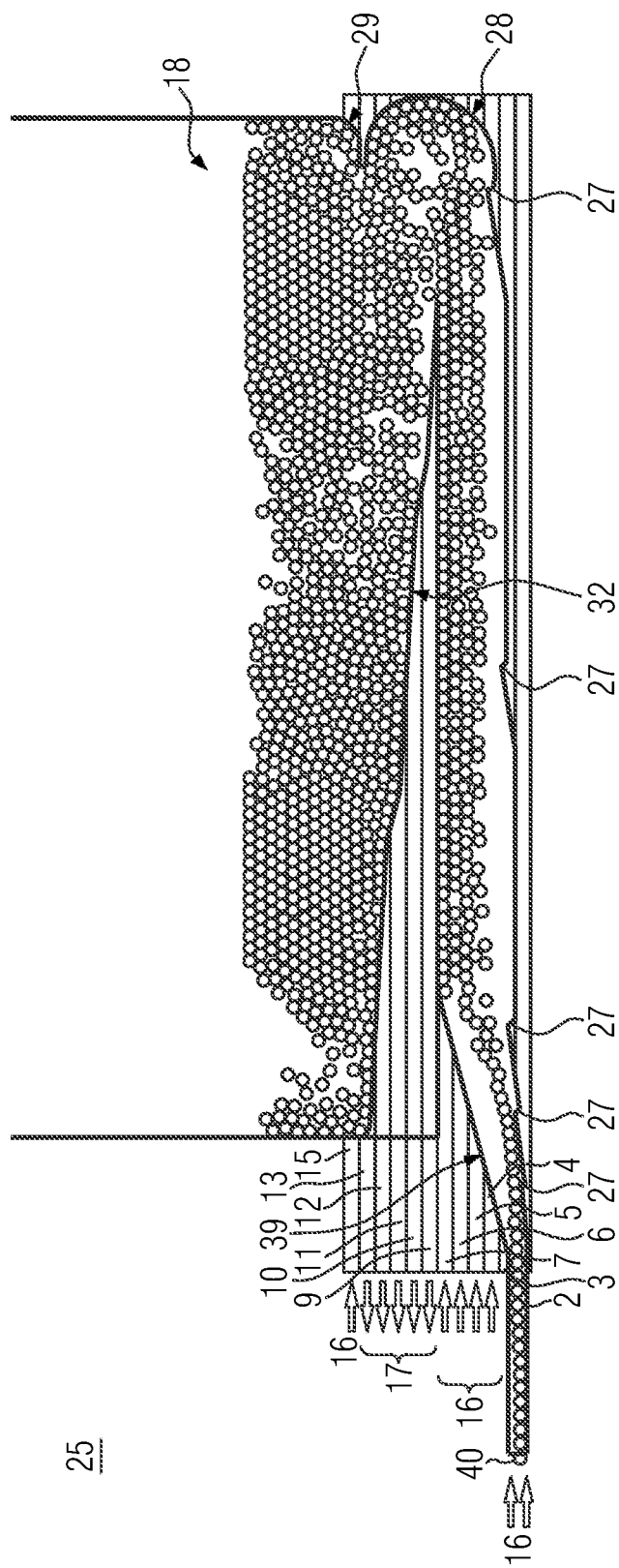
FIG. 5 shows a plan view onto a schematic view of the second embodiment of the container supply device in which a container distribution at a given point in time is represented.

FIG. 5 shows a plan view onto a schematic view of the second embodiment of the container supply device 25 in which a distribution of containers 40 at a given point in time is represented.

One can see how containers 40 coming from the single-track input conveyor 2 are distributed to the plurality of first conveyors 3 to 7 by the deflectors 27. In the transition region 31, the containers 40 pass from the first group 8 to the second group 14. By the length 34 of the transition region 31 whose value is greater than a value of the conveying width 35, 36 of the first group 8 or the second group 14 by a factor of 1.8 to 3, a loose transport of the containers can take place. This becomes clear by the free gaps between the containers 40.

By means of the rail 32 with the steps 33, the containers 40 can be directed without pressure from the plurality of parallel second conveyors 9 to 13 to the further single-track feed conveyor 15 and to the mass flow conveyor 18.

Since the further single-track feed conveyor 15 moves into the first direction 16, that means into the original input direction of the single-track input conveyor 2, a distribution and a transfer of the containers 40 to the mass flow conveyor 18 can be improved. Containers 40 that are transferred from the further single-track feed conveyor 15 to the mass flow conveyor 18 can also well be transferred into the region of the mass flow conveyor 18 which is opposite to the end of the further single-track feed conveyor 15.

The invention claimed is:

1. Container supply device for supplying containers to a mass flow conveyor, wherein the container supply device comprises:
   an at least single-track input conveyor which is drivable in a first direction and is designed to convey containers in the first direction,
   adjoining the at least single-track input conveyor parallel to the at least single-track input conveyor, a first group of a plurality of parallel first conveyors which are drivable in the first direction and are designed to convey containers in the first direction,
   adjoining the first group of the plurality of parallel first conveyors, parallel to the first group, a second group of a plurality of parallel second conveyors, which are drivable in a second direction and are designed to convey containers in the second direction which is opposite to the first direction,
   a control device for controlling drive speeds of the conveyors,
   wherein the containers of the second group of the plurality of parallel second conveyors can be transferred transversely to the second direction in the direction to the mass flow conveyor,
   wherein above a transport surface of the at least single-track input conveyor and above at least some of the transport surfaces of the plurality of parallel first conveyors, a rail with deflectors is provided,
   wherein at the end of at least some of the plurality of parallel first conveyors and at the beginning of at least some of the plurality of parallel second conveyors, above the transport surfaces, a concavely designed rail is provided, and
   wherein the rail with the deflectors, passes over into the concavely designed rail.

2. Container supply device according to claim 1, wherein a transfer region, in which the containers of the second group of the plurality of parallel second conveyors can be transferred, transversely to the second direction in the direction, to the mass flow conveyor, has a length which is at least twice as large as a conveying width of the container supply device.

3. Container supply device according to claim 1, wherein, adjoining the second group of the plurality of parallel second conveyors parallel to the second group, a further single-track feed conveyor is provided, or a plurality of further single-track feed conveyors are provided, wherein the further single-track feed conveyor or the plurality of further single-track feed conveyors is/are drivable in the first direction and is/are designed to convey containers in the first direction.

4. Container supply device according to claim 3, wherein the further single-track feed conveyor or the plurality of further single-track feed conveyors comprise(s) a supply length region along which containers can be supplied from the further single-track feed conveyor or the plurality of further single-track feed conveyors to the mass flow conveyor, wherein the supply length region has a length that is at least twice as large as a conveying width of the container supply device.

5. Container supply device according to claim 1, wherein the concavely designed rail comprises a curve that describes an angle lying within a range of angles of 165° to 195°.

6. Container supply device according to claim 1, wherein above a transport surface at the end of the further single-track feed conveyor, a further concave rail is provided, wherein, the further concavely designed rail passes over into the concavely designed rail, wherein, the further concave rail comprises a curve which describes an angle that is within a range of angles of 75° to 105°.

7. Container supply device according to claim 1, wherein above the transfer surfaces between the first group and the second group, a straight rail is provided which is designed such that a transition region for containers is provided between the first group and the second group.

8. Container supply device according to claim 7, wherein above the transport surfaces of the plurality of parallel second conveyors, a rail with steps is provided, wherein, the rail with the steps leaves the transition region free for containers, wherein, the straight rail passes over into the rail with the steps.

9. Container supply device according to claim 7, wherein the transition region, seen along the first direction or the second direction, has a length whose value is greater by a factor of 1.8 to 3 than a value of a conveying width of the first group or the second group.

10. Container supply device according to claim 3, wherein the at least single-track input conveyor and/or the plurality of parallel first conveyors, and/or the plurality of parallel second conveyors, and/or the further single-track feed conveyor, or the plurality of further single-track feed conveyors each comprise transport surfaces which are arranged in a coplanar manner in a plane, wherein the plane includes an angle of 0.5° to 14° with a plane perpendicular to the direction of action of the force of gravity, or, an angle of 0.5° to 11°, or, an angle of 0.5° to 8°.

11. Container supply device according to claim 3, wherein, a controller is provided wherein the mathematical amount of drive speeds each decreases, starting from the at least single-track input conveyor to the plurality of parallel first conveyors in the first direction, wherein the mathematical amount of drive speeds of the plurality of parallel second conveyors in the second direction initially increases and then decreases again, and/or wherein the mathematical amount of a drive speed of the further single-track feed conveyor in the first direction is the smallest one of the mathematical amounts, or wherein the mathematical amounts of drive speeds of the plurality of further single-track feed conveyors in the first direction are each smaller than an amount of the drive speed of the slowest one of the plurality of parallel second conveyors.

12. Container supply device according to claim 1, wherein exactly one single-track input conveyor is provided.

13. Container supply device according to claim 1, wherein two or more single-track input conveyors are provided.

14. Method for operating a container supply device, the container supply device for supplying containers to a mass flow conveyor, comprising an at least single-track input conveyor which is drivable in a first direction and is designed to convey containers in the first direction, adjoining the at least single-track input conveyor parallel to the at least single-track input conveyor, a first group of a plurality of parallel first conveyors which are drivable in the first direction and are designed to convey containers in the first direction, adjoining the first group of the plurality of parallel first conveyors, parallel to the first group, a second group of a plurality of parallel second conveyors, which are drivable in a second direction and are designed to convey containers in the second direction which is opposite to the first direction, a control device for a control of the container supply device,
the method comprising:
controlling drive speeds of the conveyors by the control device,
transferring the containers of the second group of the plurality of parallel second conveyors transversely to the second direction in the direction to the mass flow conveyor.

15. Method according to claim 14, wherein a control of the container supply device is accomplished by the control device, wherein, in a control, the mathematical amount of the drive speed of the at least single-track input conveyor in the first direction is within a range of 0.05 m/s to 3.5 m/s, wherein it is furthermore provided that the mathematical amount of drive speeds each decreases, starting from the at least single-track input conveyor to the plurality of parallel first conveyors in the first direction, wherein the mathematical amount of drive speeds of the plurality of parallel second conveyors in the second direction initially increases and then decreases again, and/or wherein the mathematical amount of a drive speed of the further single-track feed conveyor in the first direction is the smallest one of the mathematical amounts, or wherein the mathematical amounts of drive speeds of the plurality of further single-track feed conveyors in the first direction are each smaller than an amount of the drive speed of the slowest one of the plurality of parallel second conveyors.

16. Method according to claim 14, wherein a control of the container supply device is accomplished by the control device, wherein, in a control, the mathematical amount of the drive speed of the at least single-track input conveyor in the first direction can be within a range of 1.5 m/s to 1.9 m/s, wherein the mathematical amount of the drive speeds of the plurality of parallel first conveyors in the first direction decreases from 0.65 m/s to 1.05 m/s to 0.05 m/s to 0.45 m/s, wherein the mathematical amount of the drive speeds of the plurality of parallel second conveyors in the second direction increases initially from 0.01 m/s to 0.35 m/s to 0.2 m/s to 0.6 m/s, and then decreases again from 0.15 m/s to 0.55 m/s to 0.01 m/s to 0.35 m/s, and/or wherein the mathematical amount of a drive speed of the further single-track feed conveyor in the first direction is the smallest one of the mathematical amounts with 0.06 m/s to 0.1 m/s.

17. Method according to claim 15, wherein the grading of the different drive speeds is non-linear with respect to each other, where, the gradings are each percental with respect to each other or each amount to a factor.

* * * * *